April 8, 1969 E. W. APRI 3,437,274
LIQUID SPRAY APPARATUS
Filed July 26, 1966
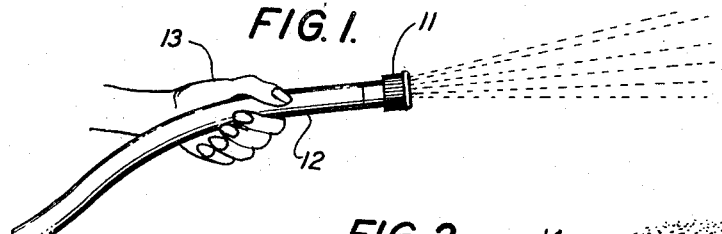
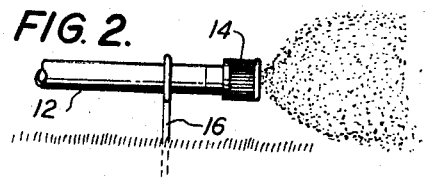
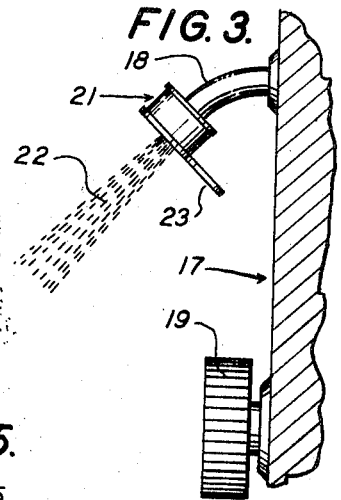
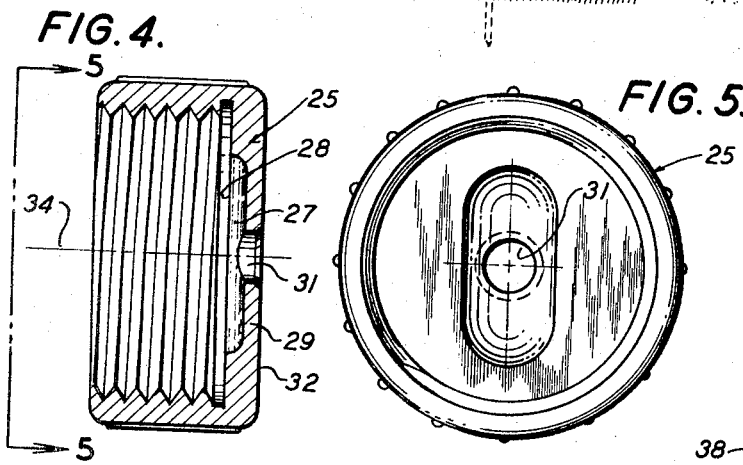
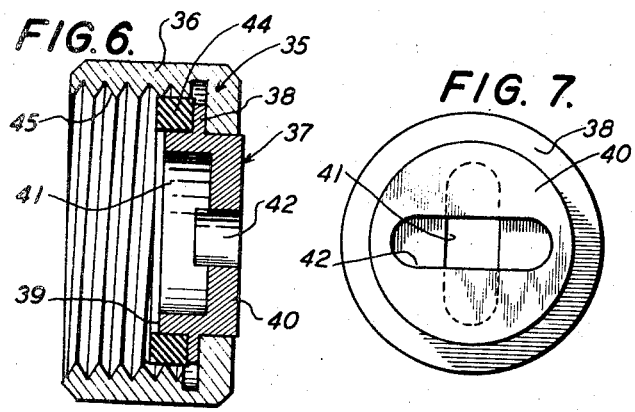
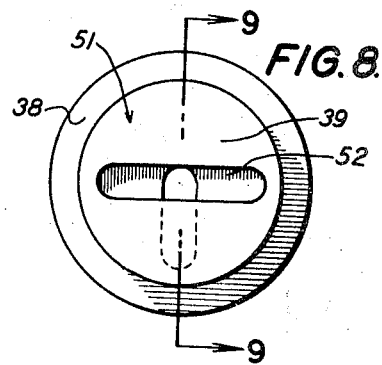
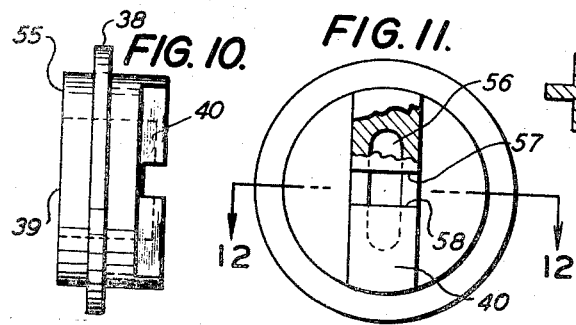
INVENTOR.
EDWARD W. APRI
BY
W. J. Gribble
ATTORNEY

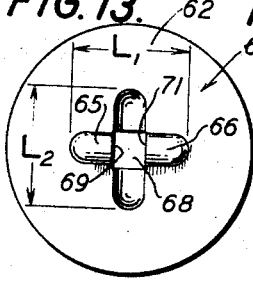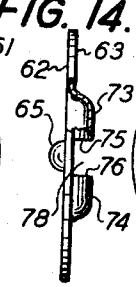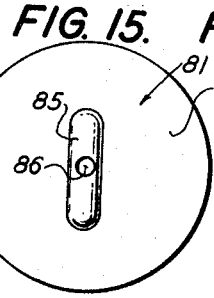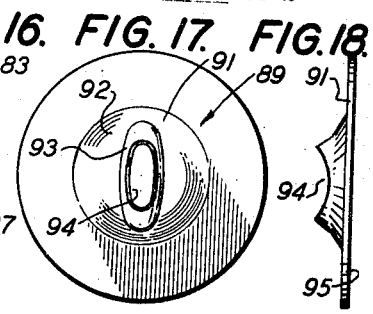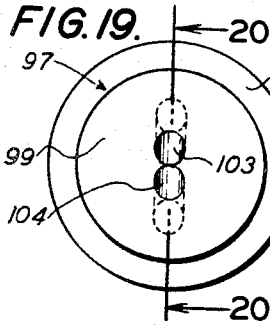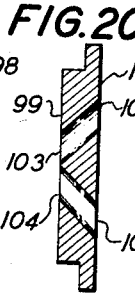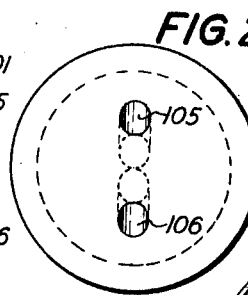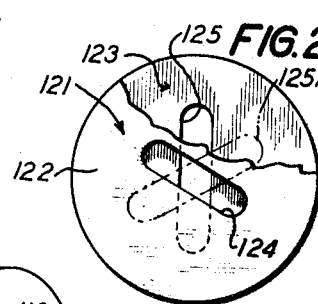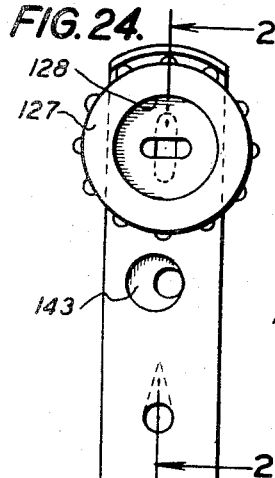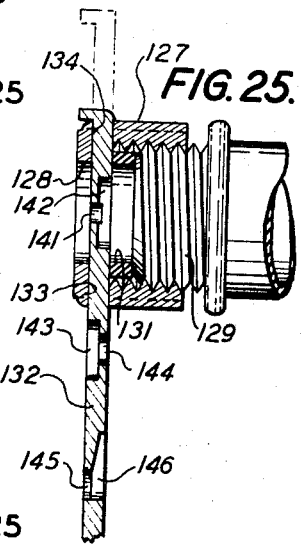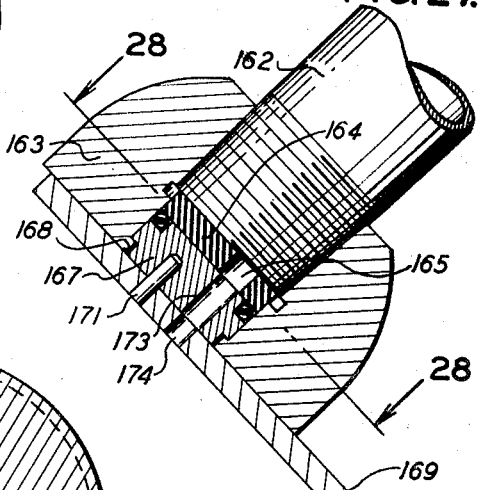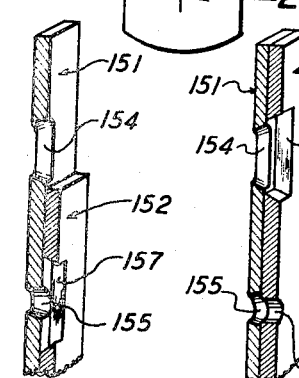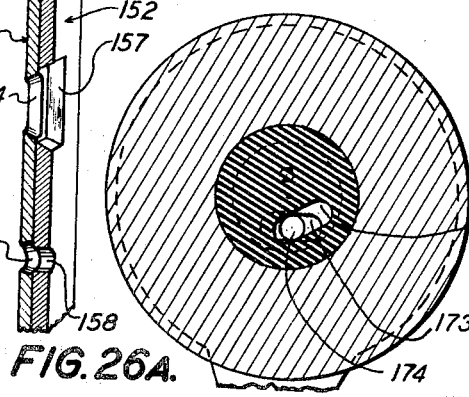

United States Patent Office 3,437,274
Patented Apr. 8, 1969

3,437,274
LIQUID SPRAY APPARATUS
Edward W. Apri, 998 Lehigh St.,
Altadena, Calif. 91001
Filed July 26, 1966, Ser. No. 567,975
Int. Cl. B05b 1/12
U.S. Cl. 239—599    1 Claim

ABSTRACT OF THE DISCLOSURE

A pipe or garden hose attachment that comprises an internally threaded retainer which secures a replaceable disc across the discharge of the pipe or hose. The apertures are preferably one in each face of the disc, directly fluidly connected and differing one from the other in orientation of their respective major and flow aperture axes.

---

A large variety of nozzles is presently in use every day. Spray nozzles for gardening, for use in the kitchen sink of homes and in shower baths range from the very simple to the very complicated. Some conventional nozzles are capable of a wide range of adjustment. Others, like those conventionally used in kitchen sinks, are limited to a particular type of spray. I have invented spray apparatus for use with a source of liquid under pressure which is extremely simple to fabricate and to utilize. It is easily affixed to the end of many types of conduits for liquid under pressure. The apparatus of the invention is equally adaptable to liquid spray usages wherein a particular type of spray pattern is desired as in insecticide or other chemical sprayers, or may be embodied in apparatus which is adjustable to give a great variety of spray patterns.

The invention contemplates a liquid spray nozzle that comprises a spray head adapted for attachment to a source of liquid under pressure. A discharge wall in the spray head substantially perpendicular to the flow of liquid from the liquid source contains a first shaped aperture in its inner face and a second shaped aperture in its outer face. Each aperture preferably has a major axis, a minor axis and a flow axis. The apertures in each face of the wall communicate and are so disposed that one of the said three axes is displaced with respect to the like axis of the other aperture.

The discharge wall may be embodied in an insert to be placed within a spray head. The insert may be molded of plastic or other material, or may be formed by a stamping process from a metal wafer. The discharge wall may comprise two discs, each of which contains one of the apertures. Each of the discs may be rotatable about the flow axis with respect to the other disc to alter the spray pattern emerging through the reoriented apertures of the discharge wall. The apertures themselves may take many shapes, being defined by figures such as circles, ovals, ellipses, figures with open ends, rectangles and triangles, and also be three-dimensional volumes of varying depth.

Any of the embodiments of the invention is easily fabricated with present technology and assembled with any of the conventional conduits for sources of liquid under pressure. The configurations of the apertures may be achieved through molding, stamping, piercing, milling or other common forming techniques. The invention may be embodied in a spray head of any size. The spray patterns may vary from a dispersal of minute particles, such as obtained from a fog nozzle to a pulsating, compact stream.

These and other advantages of the invention are apparent from the following detailed description and drawing in which like parts have like reference characters:

FIG. 1 illustrates an embodiment of the invention in use on a hand-held garden hose;

FIG. 2 is an elevational view of a spray nozzle in accordance with the invention on a hose held by a ground-supported bracket;

FIG. 3 is a fragmentary view of an adjustable bath shower spray nozzle;

FIG. 4 is a longitudinal sectional elevation through a spray nozzle in accordance with the invention;

FIG. 5 is an elevational view taken along line 5—5 of FIG. 4;

FIG. 6 is a sectional elevation of an embodiment of the invention employing an insertable discharge wall;

FIG. 7 is an elevational view of the insert of FIG. 6;

FIG. 8 is an elevational view of an alternate insert of the invention;

FIG. 9 is a sectional elevation taken along line 9—9 of FIG. 8;

FIG. 10 is a side elevation of another insertable discharge wall;

FIG. 11 is a front elevational view, partly broken away, of the embodiment of FIG. 10;

FIG. 12 is a sectional plan view taken along line 12—12 of FIG. 11;

FIG. 13 is an elevational view of a further discharge wall insert embodiment of stamped metal;

FIG. 14 is a side elevation, partly in section, of the embodiment of FIG. 13;

FIG. 15 is a front elevation of a further insert embodiment of stamped metal or like material;

FIG. 16 is a side elevation, partly in section, of the embodiment of FIG. 15;

FIG. 17 is a front elevation of a still further embodiment of a stamped discharge wall insert in accordance with the invention;

FIG. 18 is a side elevation of the embodiment of FIG. 17;

FIG. 19 is a front elevation of a still further embodiment of a discharge wall insert having apertures with diverging flow axes;

FIG. 20 is a sectional elevation taken along line 20—20 of FIG. 19;

FIG. 21 is an elevational view of the reverse face of the insert of FIG. 19;

FIG. 22 is an oblique elevation of a discharge wall insert having discontinuous second apertures;

FIG. 23 is a sectional elevation, partly broken away, of a discharge wall comprised of two apertured discs;

FIG. 24 is a front elevation of an alternate embodiment of a nozzle in accordance with the invention having a discharge wall insert with selectively interchangeable aperture combinations;

FIG. 25 is a sectional elevation taken along line 25—25 of FIG. 23;

FIGS. 26 and 26A illustrate in section alternate positions of a split discharge wall insert;

FIG. 27 illustrates in sectional elevation a shower head in accordance with the invention; and FIG. 28 is a framentary sectional view taken along line 28—28 of FIG. 25.

FIG. 1 illustrates a spray head 11 in accordance with the invention attached to a conventional garden hose 12 and being held in the hand 13 of a user.

In FIG. 2 a spray head 14 is attached to a garden hose 12 which is held by a ground bracket 16.

FIG. 3 illustrates a shower installation 17 in which a water conduit 18 is controlled by a hand valve 19. An adjustable spray head 21 in accordance with the invention emits a shower stream 22. The stream may be controlled by means of control handle 23 of the spray head.

Each of the three figures is shown with a spray head emitting a different type of spray. The type of spray pattern is dependent upon the relationship and configuration of the apertures in the discharge wall of the spray head. For instance, a spray head 25 of FIGS. 4 and 5 has a first vertically elongate aperture 27 in an inner face 28 of a discharge wall 29. The first aperture communicates with a second aperture 31 in an outer face 32 of wall 29. The two apertures are displaced along the flow axis 34 of the spray head, although the major and minor axes of the two apertures may be said to coincide, as viewed in FIG. 5. The spray pattern of spray head 25 is wide and flat, with a 10° to 15° horizontal spread from the central flow axis.

Spray head 25 is combined with a liquid conduit, such as a common garden hose. A conventional rubber or plastic washer (not shown) seals the spray head against the threaded end of the hose.

FIGS. 6 and 7 illustrate an alternate embodiment of the invention in which a spray head 35 comprises a spray head body 36 and a cylindrical discharge wall insert 37. The insert has an annular flange 38, an inner face 39 and an outer face 40. A vertically elongate first aperture 41 communicates with a horizontally elongate second aperture 42. The apertures may differ in length. The first and second apertures reside, respectively, in the inner and outer faces of the insert.

A conventional hose washer 44 lodges within a threaded aperture 45 of body 36 and seals against insert flange 38.

When insert 37 of FIG. 6 is used in the orientation shown, a wide horizontal spray pattern results. However, the insert may be reversed within the spray head body by removal of washer 44 and reorientation of the apertures such that a different spray pattern is achieved.

This is also true of the discharge wall insert embodiment shown in FIGS. 8 and 9. An insert 51 has a flange 38 and inner and outer faces 39, 40. A horizontally elongate aperture 52 resides in inner face 39. A vertically elongate aperture 53 resides in outer face 40. The two apertures, in addition to being displaced along the flow axis of the spray head, are so oriented that their respective major and minor axes do not line up. The spray pattern, when this insert is used as in the fashion of the embodiment of FIG. 6, is considerably different from the spray patterns achieved with the other discharge walls previously discussed. This insert, too, may be reversed with respect to the flow line of the spray head such that the inner face becomes the outer face with the resultant radical change in the character of the spray pattern.

In FIGS. 10–12, a discharge wall insert 55 has a flange 38, an inner face 39 and outer face 40. The outer face is vertically rectangular instead of being defined by the circular perimeter of the previously described inserts. A first vertically elongate aperture 56 resides in inner face 39. Parallel horizontal walls 57 and 58 in outer face 40 define an open-ended aperture in that face. The major axes of the two apertures are perpendicularly disposed.

The discharge wall insert of FIG. 10 affords a fine stream spray pattern with approximately 180° dispersal in the horizontal.

FIGS. 13–18 illustrate inserts for use with a spray head body such as that of FIG. 6 which are preferably made from metal by a stamping technique. In FIGS. 13 and 14 the discharge wall insert comprises a metal disc 61 of generally circular configuration. The disc has an observe face 62 and a reverse face 63. Obverse face 62 has two aligned convex lobes 65, 66 separated by an aperture 68 defined in part by vertical edges 69, 71 of lobes 65, 66, respectively. Reverse face 63 has a pair of aligned convex lobes 73, 74 which terminate near the center of the disc in vertical edges 75, 76, which define an aperture 77. Thus, in the embodiment of FIGS. 13 and 14 there are apertures in each of the faces that are perpendicular with respect to one another in terms of major axes and displaced along the flow axis of the stream. Like the previously described embodiments, the insert of FIG. 13 gives a varied spray pattern when reversed in orientation with respect to the flow of the stream. The spray pattern is also altered by changes in the total length $L_1$ of the horizontal lobes and the total length $L_2$ of the vertical lobes.

In FIGS. 15 and 16 a circular disc 81 has obverse and reverse faces 82, 83, respectively. Face 82 encompasses a vertically elongate lobe 85 in which a circular aperture 86 resides centrally. An aperture 87 is defined in face 83 by the concavity of the lobe with respect to face 83. When the observe face 82 of the embodiment of FIGS. 15 and 16 is in the upstream position, a wide horizontal spray pattern results.

The same general type of spray pattern results from the combination of a discharge wall insert 89 of FIGS. 17 and 18 with a spray head body. In this embodiment obverse face 91 comprises a generally conical protrusion 92, from which a substantially oval projection 93 extends. The oval projection has a substantially oval aperture 94.

Reverse face 95 has a substantially circular aperture defined by the concavity of conical protrusion 92. A secondary aperture between the first and second apertures is defined by the intersection of projection 93 with conical protrusion 92. Due in part to the concave configuration of first aperture 94, as is visible in FIG. 18, there is a marked change in the spray pattern when disc 89 is reversed with respect to the flow of the liquid stream.

FIGS. 19–21 illustrate a discharge wall insert 97 which has a flange 98 and observe and reverse faces 99, 101, respectively. Each of the faces has two apertures. Face 99 has apertures 103, 104, and reverse face 101 has apertures 105, 106. As can be seen from FIG. 20, the streams flowing from apertures 105 and 106 to apertures 103 and 104, respectively, converge at the obverse face. Depending upon water pressure, the scattered dispersal of the liquid emerging approaches a fog. Unlike the previously described discharge wall inserts, the insert 98 has primary usefulness only when the flow is from the reverse to the obverse sides. Reversing the insert within the spray head body results in twin solid divergent streams emerging from apertures 105 and 106.

FIG. 22 illustrates a further embodiment of the invention wherein a preferably metallic insert 109 has a substantially triangular aperture 110 in the first face 111 of the disc. A second face 112 is defined by a triangular tab 113 preferably punched from the central material of the disc. Second apertures adjacent the second face 112 are defined by first face 111 and the converging edges 115, 116 of the triangular tab.

A fine spray results when flow is through the spray apparatus of FIG. 22 in the direction of arrow 117. A coarser spray with big droplets results from use of the insert of FIG. 22 when oppositely oriented.

In FIG. 23 an alternate discharge wall insert 121 is comprised of two circular discs 122, 123. Each disc has an elongate central slot 124, 125. The slots may differ in length. Let us regard slot 124 as being the aperture in the obverse face and slot 125 as being the aperture in the reverse face. The two discs may be locked in the orientation shown in FIG. 23 by pressure of the water hose coupling impinging upon a resilient washer to wedge the two discs within a spray head. The discs may be reoriented so that the second aperture may be moved to the position 125A of FIG. 23. This new orientation may be achieved by releasing the pressure on the washer and turning the disc from the front end of the spray apparatus. Reorientation also may be achieved by removing the water conduit, reorienting the discs and then replacing them in the spray head body. Thus the embodiment shown in FIG. 23 is adjustable to give a wide range of spray patterns without the necessity of using alternate discharge wall inserts.

FIGS. 24 and 25 illustrate a further embodiment of the invention adapted to give diverse spray patterns with the same apparatus. An internally threaded spray head body 127 has a large circular front outlet 128. The body receives the threaded end 129 of a conventional garden hose or other water conduit. An annular resilient gasket 131 intervenes between the hose end and a slidable discharge wall member 132. The wall member slides within diametrically opposed slots 133, 134 in the spray head body adjacent outlet 128.

The discharge wall member has three pairs of aligned apertures. Aperture pair 141, 142 is in effective position within the spray head. Pair 143, 144 is outside of the spray head and thus inoperative. Aperture pair 145, 146 is also in inoperative position.

Due to the fact that the pairs of apertures result in differing spray patterns when the stream flow is reversed with respect to the orientation of the apertures, the apparatus of FIGS. 24 and 25 affords a spray nozzle wherein six different spray patterns are readily available. Three patterns may be achieved by sliding adjustment without removing the discharge wall member from the spray head. Three different patterns may be achieved by removing the member and reversing it with respect to stream flow within the spray head.

FIGS. 26 and 26A illustrate a modification of the apparatus of FIG. 24 wherein the discharge wall member comprises two wall strips 151, 152, each with variously shaped apertures extending through the strips at equal intervals along a vertical line in the strip. As shown fragmentarily in FIGS. 26 and 26A, strip 151 has apertures 154, 155. Strip 152 has apertures 157, 158. The strips may have additional apertures. The apertures may change in configuration from face to face of each strip, being conical or tapered. Thus, in addition to being able to change the combination of obverse and reverse face apertures, the respective configurations of the apertures with respect to stream flow may be changed by reversing the face of one strip with respect to the adjacent strip. Therefore, one pattern change can be effected by moving aperture 157 of strip 152 to coincide with aperture 154 instead of aperture 155 of FIG. 26. A second series of spray patterns may be obtained by reversing strip 152 such that the spray pattern resulting from coincidence between the axes of any two apertures differs from the spray pattern achieved with coincidence of the axes in the strip orientation of FIG. 26.

FIGS. 27 and 28 illustrate a spray apparatus in accordance with the invention particularly adapted for use as a shower bath spray nozzle. A water pipe 162 is threadably engaged with a spray head body 163. A resilient gasket 164 resides within a cavity within the spray head body. The gasket has an elongate slot 165 which is asymmetrically disposed with respect to the center line of the gasket. A cylindrical insert 167 resides within the cavity and is retained by an annular cavity lip 168. The insert and gasket define a discharge wall. A control handle 169 is secured to the outer face of the insert by a plurality of pins, such as pin 171. Alternatively, the handle and the insert may be jointed by various waterproof adhesives.

The insert has a distribution chamber 173. The chamber connects to an aperture 174 in the control handle. Apertures 165 and 174 may be said to act as the first and second apertures of the spray device. As can be seen from FIG. 28, communication between the two apertures is altered by revolution of handle 169. Each degree of revolution changes the spray pattern because the positions of the two apertures with respect to one another are changed.

Opening 173 acts primarily to connect the two apertures but imposes its own constrictions upon the emerging spray pattern. Therefore, a change in the configuration of either of the three openings 165, 173, 174 alters the spray pattern. The configurations therefore are determined by the type of spray desired for the particular usage and that basic spray pattern can then be altered by manipulation of control handle 169.

The embodiment of FIG. 27 has configurations that adapt the emitted spray for shower bath use. Liquid emerges in a pulsating spray of seemingly individual droplets of about one-eighth inch diameter. The effect on a user is similar to that obtained with conventional massage equipment.

Although many modifications of the invention have been illustrated in the foregoing disclosure, these do not exhaust the scope of the invention. Other modifications within the scope of the invention will occur to those skilled in this art. Therefore, I desire that the invention be measured by the appended claims, rather than by the foregoing illustrative disclosure.

I claim:

1. A liquid spray nozzle for attachment to a source of liquid under pressure comprising a spray head adapted for connection to the source, said spray head having a hollow body portion, a removable discharge wall insert in the body portion across the flow path of liquid from the liquid source; said insert having a radial flange about its periphery spaced along the flow path from each of the inner and outer faces of the insert; a first shaped aperture in the inner face of the discharge wall insert, and a second shaped aperture in the outer face of the discharge wall insert directly communicating with the first aperture; at least one of said apertures extending centrally of the insert from its respective face of entry at least to a point aligned on the flow path with the flange on the insert; each of said apertures having a major axis, a minor axis and a flow axis, at least one of said major and flow axes of the first aperture being displaced with respect to the like axis of the other aperture; and said discharge wall insert being adapted for reversal of faces reorientation with respect to the flow path of liquid from the flow source to alter the spray pattern of the emerging liquid.

References Cited

UNITED STATES PATENTS

| | | | |
|---|---|---|---|
| 1,276,245 | 8/1918 | Millard et al. | 239—596 |
| 1,823,635 | 9/1931 | Williams | 239—601 X |
| 2,325,008 | 7/1943 | Gruett | 239—597 |
| 2,522,928 | 9/1950 | Carroll | 239—597 X |
| 2,563,152 | 8/1951 | Brandt | 239—596 |
| 2,665,946 | 1/1954 | Broughton | 239—601 X |
| 2,701,412 | 2/1955 | Wahlin | 239—599 X |
| 2,987,262 | 6/1961 | Goyette | 239—596 X |
| 3,107,060 | 10/1963 | Coursey | 239—601 X |

WALTER SOBIN, *Primary Examiner.*

U.S. Cl. X.R.

239—601